US010056795B2

(12) United States Patent
Oketani et al.

(10) Patent No.: US 10,056,795 B2
(45) Date of Patent: Aug. 21, 2018

(54) EMBEDDED-PERMANENT-MAGNET ELECTRIC MOTOR

(71) Applicant: Mitsubishi Electric Corporation, Tokyo (JP)

(72) Inventors: Naohiro Oketani, Tokyo (JP); Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 222 days.

(21) Appl. No.: 15/032,656

(22) PCT Filed: Dec. 4, 2014

(86) PCT No.: PCT/JP2014/082102
§ 371 (c)(1),
(2) Date: Apr. 28, 2016

(87) PCT Pub. No.: WO2015/087773
PCT Pub. Date: Jun. 18, 2015

(65) Prior Publication Data
US 2016/0268856 A1    Sep. 15, 2016

(30) Foreign Application Priority Data

Dec. 9, 2013 (WO) .................. PCT/JP2013/082941

(51) Int. Cl.
*H02K 1/27* (2006.01)
*H02K 1/14* (2006.01)

(52) U.S. Cl.
CPC ............... *H02K 1/276* (2013.01); *H02K 1/14* (2013.01); *H02K 2213/03* (2013.01)

(58) Field of Classification Search
CPC ........ H02K 1/276; H02K 1/14; H02K 1/2766; H02K 1/2773; H02K 1/272; H02K 2213/03

(Continued)

(56) References Cited

U.S. PATENT DOCUMENTS

2012/0248915 A1    10/2012 Kagami et al.
2013/0026872 A1*   1/2013 Cirani .................. H02K 1/2766
                                                        310/156.08
2014/0217859 A1*   8/2014 Saito ...................... H02K 1/276
                                                        310/156.12

FOREIGN PATENT DOCUMENTS

JP      09-294344 A    11/1997
JP      2001-016809 A   1/2001
(Continued)

OTHER PUBLICATIONS

Machine translation of JP 2002136008 A (May 2002).*
(Continued)

*Primary Examiner* — Michael Andrews
(74) *Attorney, Agent, or Firm* — Posz Law Group, PLC

(57) ABSTRACT

Provided is an interior permanent magnet motor including: a stator; and a rotor, the rotor including separated permanent magnets for one magnetic pole, in which: a rotor core includes the same number of separated magnet insertion holes as that of the plurality of permanent magnets for one magnetic pole; bridges are formed between respective adjacent ones of the magnet insertion holes in each magnetic pole; each of the bridges includes a pair of parallel linear portions and two pairs of curved portions; under a state in which the permanent magnets are inserted into the magnet insertion holes, the pair of linear portions are in contact with edge surfaces of the permanent magnets; the pair of curved portions are connected to ends of the linear portions; and an interval between the pair of curved portions becomes larger as the interval becomes away from the linear portions.

6 Claims, 7 Drawing Sheets

(58) Field of Classification Search
USPC .................................... 310/156.53, 156.57
See application file for complete search history.

(56) References Cited

FOREIGN PATENT DOCUMENTS

| | | | | |
|---|---|---|---|---|
| JP | 2002-136008 A | 5/2002 | | |
| JP | 2002136008 A | * 5/2002 | .............. | H02K 1/27 |
| JP | 2002-281700 A | 9/2002 | | |
| JP | 2005-245120 A | 9/2005 | | |
| JP | 2008-182824 A | 8/2008 | | |
| JP | 2012-205472 A | 10/2012 | | |
| JP | 2013-081302 A | 5/2013 | | |
| WO | 2009/069718 A1 | 6/2009 | | |

OTHER PUBLICATIONS

International Search Report of the International Searching Authority dated Mar. 3, 2015 for the corresponding international application No. PCT/JP2014/082102 (and English translation).

* cited by examiner

EMBEDDED-PERMANENT-MAGNET ELECTRIC MOTOR

CROSS REFERENCE TO RELATED APPLICATIONS

This application is a U.S. national stage application of International Application No. PCT/JP2014/082102 filed on Dec. 4, 2014, which is based on and claims priority to International Application No. PCT/JP2013/082941 filed on Dec. 9, 2013, the disclosures of which are incorporated herein by reference.

TECHNICAL FIELD

The present invention relates to an interior permanent magnet motor.

BACKGROUND ART

In a general interior permanent magnet motor, as many magnet insertion holes as the number of poles are formed in advance in a circumferential direction at approximately regular intervals through a rotor core formed by laminating and fixing a plurality of magnetic steel sheets punched into a predetermined shape, and one permanent magnet, which has an approximately rectangular cross-sectional shape when viewed in an axial direction, is inserted into each magnet insertion hole. There is a thin portion between both ends of the magnet insertion hole and an outer circumferential surface of the rotor core. This is because a portion between both the ends of the magnet insertion hole and the outer circumferential surface of the rotor core serves as a path for a so-called leakage magnetic flux, which is a magnetic flux flowing out of a surface of the permanent magnet and into another surface of the permanent magnet without passing through a stator core and contributing to an output, and thus this portion is often designed to have a smallest thickness required for securing strength.

However, in the rotor core having such a thin portion, a portion on a radially outer side and a portion on a radially inner side of the magnet insertion hole are connected to each other via the thin portion. Thus, when an upper limit on the number of revolutions of a motor is raised, the strength of the rotor core is required to be improved because the magnitude of a centrifugal force acting on a rotor is proportional to the square of the number of revolutions.

To handle such a situation, for example, in Patent Literature 1, there is disclosed a structure in which the magnet insertion hole of one magnetic pole is divided into a plurality of holes in a circumferential direction (thus, a permanent magnet of one magnetic pole is also divided into a plurality of permanent magnets in a circumferential direction), and a bridge configured to connect a portion on a radially outer side and a portion on a radially inner side is formed in that divided position, to thereby intend to achieve improvement of the strength of the rotor core against the centrifugal force. Further, in Patent Literature 1, there is also disclosed forming an arc portion at a corner portion formed at a root of the bridge in consideration of the fact that stress is concentrated on the corner portion formed at the root of the bridge.

Further, in Patent Literature 2, there is disclosed forming the bridge itself into a curved shape similarly in consideration of the fact that stress is concentrated on the corner portion formed at the root of the bridge.

CITATION LIST

Patent Literature

[Ptl 1] Jp 2002-281700 a
[PTL 2] WO 2009/069718 A1

SUMMARY OF INVENTION

Technical Problem

However, in any of the structures disclosed in Patent Literature 1 and Patent Literature 2, there is a gap between the permanent magnet having an approximately rectangular cross-sectional shape and the bridge, and thus the insertion space of the permanent magnet is not fully utilized by that gap. In other words, dimensions in a circumferential direction of the permanent magnet are set smaller by that gap. Because of this, the amount of magnetic flux is decreased by the reduced amount of dimensions of the permanent magnet, resulting in deterioration in efficiency and output. On the other hand, complicating the shape of the permanent magnet so as not to produce a gap causes another problem in that the manufacture cost of the permanent magnet greatly increases. In particular, in an aspect of arranging a bridge to improve the strength of the rotor core, the number of permanent magnets is not one for one pole, and thus the increase in cost of the permanent magnet leads to a significant problem for the entire interior permanent magnet motor.

The present invention has been made in view of the above, and it is an object of the present invention to provide an interior permanent magnet motor capable of achieving improvement of the strength of the rotor core and high efficiency of the output while avoiding the increase in manufacture cost of the permanent magnet.

Solution to Problem

In order to achieve the object described above, according to one embodiment of the present invention, there is provided an interior permanent magnet motor, including: a stator; and a rotor rotatably supported to face the stator, the rotor including a plurality of separated permanent magnets for one magnetic pole, in which a rotor core of the rotor includes a plurality of the same number of separated magnet insertion holes as a number of the plurality of permanent magnets for one magnetic pole, in which bridges are formed between respective adjacent ones of the magnet insertion holes in each magnetic pole, in which each of the bridges includes a pair of parallel linear portions and two pairs of curved portions, in which, under a state in which the plurality of permanent magnets are inserted into the plurality of corresponding magnet insertion holes, each of the pair of linear portions is in contact with a corresponding edge surface of the corresponding permanent magnet in an arrayed direction, and in which the two pairs of curved portions are connected to corresponding ends of the linear portions in an extending direction of the linear portions and an interval between the pair of corresponding curved portions becomes larger as the interval becomes away from the linear portions.

Advantageous Effects of Invention

According to the one embodiment of the present invention, it is possible to achieve improvement of the strength of the rotor core and high efficiency of the output while avoiding the increase in manufacture cost of the permanent magnet.

DESCRIPTION OF EMBODIMENTS

Figure 1:
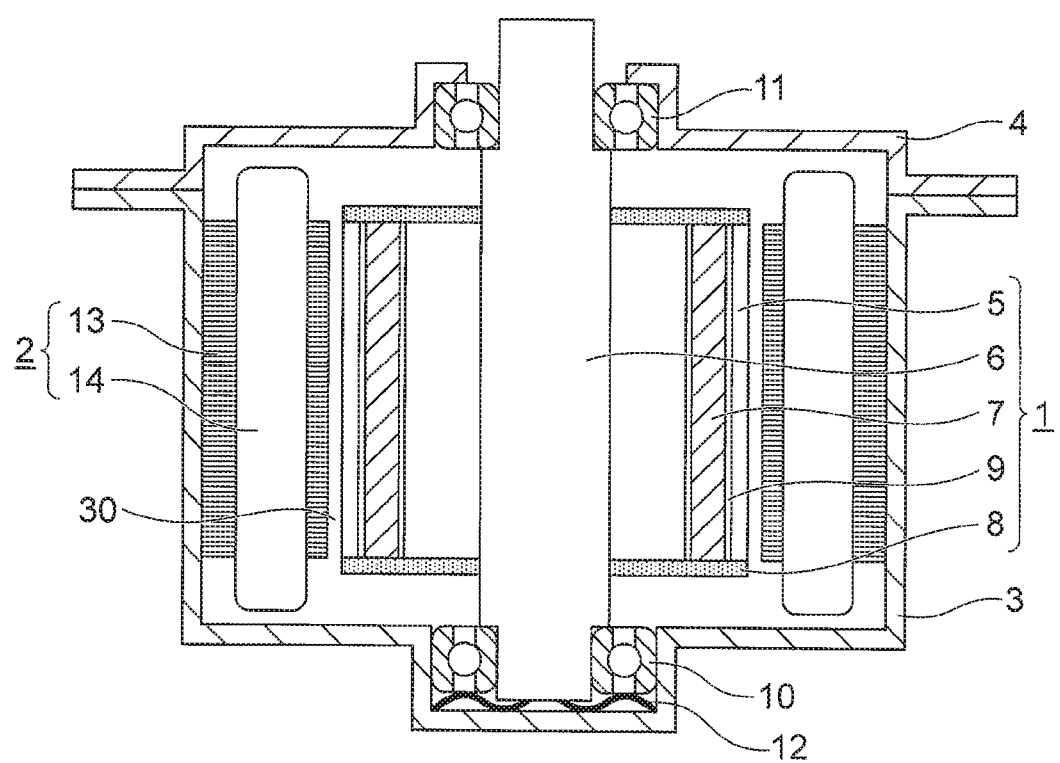
FIG. 1 is a vertical cross-sectional view of an interior permanent magnet motor when viewed from a side thereof according to a first embodiment of the present invention.

Now, an interior permanent magnet motor according to embodiments of the present invention is described with reference to the accompanying drawings. Note that, in the drawings, the same reference symbols represent the same or corresponding parts.

First Embodiment

Figure 2:
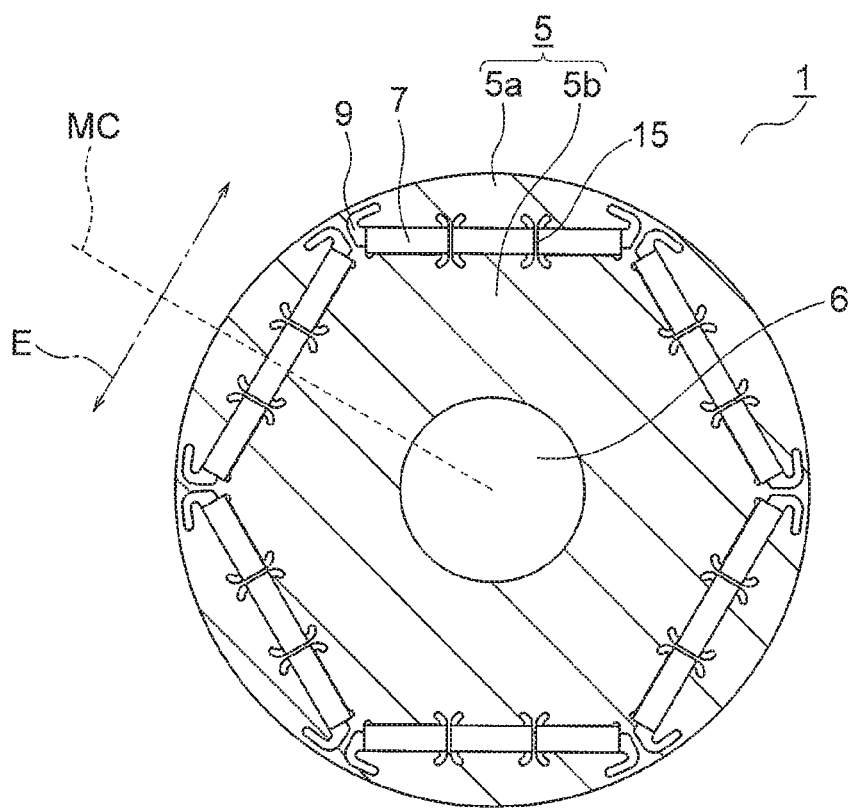
FIG. 2 is a lateral cross-sectional view of a rotor of the interior permanent magnet motor of FIG. 1 when viewed in a rotation axis direction.

FIG. 1 is a vertical cross-sectional view of an interior permanent magnet motor when viewed from a side thereof according to a first embodiment of the present invention, and FIG. 2 is a lateral cross-sectional view of a rotor of the interior permanent magnet motor of FIG. 1 when viewed in a rotation axis direction. Note that, hatching is omitted for partial enlarged views of FIG. 3 and thereafter for the sake of clarity of the figures.

The interior permanent magnet motor according to the first embodiment includes a rotor 1, a stator 2, a frame 3, and a bracket 4. The rotor 1 includes a rotor core 5, a shaft 6, rare-earth magnets 7 serving as an example of permanent magnets, and end plates 8.

The rotor core 5 is formed by, for example, laminating and fixing a plurality of magnetic steel sheets punched into a predetermined shape. The rotor core 5 has, for example, an approximately annular shape. The rotor core 5 has a plurality of magnet insertion holes 9. The plurality of magnet insertion holes 9 each extend along the rotation axis direction in the rotor core 5, and the rare-earth magnet 7 is inserted into each of the magnet insertion holes 9 in the rotation axis direction. The plurality of rare-earth magnets 7 each have a rectangular cross-sectional shape when viewed in the rotation axis direction of the rotor 1. Note that, details of those plurality of magnet insertion holes 9 are described later.

The rotor core 5 has the endplate 8 for preventing the rare-earth magnets 7 from dropping out of the magnet insertion holes 9 at each of both end surfaces in the axial direction. Fixing means for fixing the end plates 8 to the end surfaces of the rotor core 5 is not illustrated, but may be for example, welding, bonding, fastening with use of a bolt or a rivet by forming a through hole, or press fitting by forming a spigot portion.

The shaft 6 is fitted into a shaft fitting hole formed in the center of the rotor core 5. One end of the shaft 6 is rotatably supported by the frame 3 through intermediation of a bearing 10, and the other end of the shaft 6 is rotatably supported by the bracket 4 through intermediation of a bearing 11. On the bearing surface of the bearing 10, a wave washer 12 for applying a preload is arranged. The shaft 6 has, for example, a circular cross-sectional shape, and the shaft fitting hole is also formed into a circular shape in accordance therewith.

The stator 2 is configured to include a stator core 13 and a winding 14. The stator core 13 is formed by, for example, laminating and fixing a plurality of magnetic steel sheets punched into a predetermined shape. The stator core 13 has, for example, an approximately annular shape.

In parts of the stator core 13 on the radially inner side, a plurality of teeth (not shown) are formed at, for example, approximately regular intervals in the circumferential direction. The winding 14 is wound around those teeth via an insulator (not shown).

The stator 2 is fixed to the inner side of the frame 3 by methods such as shrink fitting, and is installed on the outer side of the rotor 1 so as to face the rotor 1 with a predetermined air gap 30.

The frame 3 supports one side of the rotor 1 opposed to a load side thereof through intermediation of the bearing 10, and houses the stator 2. The frame 3 has, for example, an approximately cylindrical shape. One end of the frame 3 in the axial direction is opened to have a flange shape. The frame 3 has a bottom on the other end thereof.

The bracket 4 supports the load side of the rotor 1 through intermediation of the bearing 11. The bracket 4 has, for example, an approximately cylindrical shape. One end of the bracket 4 in the axial direction is opened to have a flange shape. The other end of the bracket 4 has a hole formed therein for allowing the output end of the shaft 6 to protrude therefrom. The bracket 4 and the frame 3 are fastened to each other in a manner such as screwing while abutting together the flange parts thereof.

Next, a description is given of the details of the magnet insertion hole 9. In the present invention, the plurality of magnet insertion holes 9 are grouped as one magnetic pole unit, and the same number of configurations of those plurality of magnetic pole units as that of the poles of the motor are provided. As a specific example, the interior permanent magnet motor illustrated in FIG. 2 is an example of having six poles, and this interior permanent magnet motor has six magnetic pole units, each being assigned with three magnet insertion holes 9.

The plurality of magnet insertion holes 9 are formed on an outer side of the rotor core 5 in a radial direction. In each of the magnetic poles, the three magnet insertion holes 9 are spaced apart and arrayed at intervals in an arrayed direction E, which is perpendicular to a corresponding magnetic pole center line MC.

A bridge 15, which is a part of the rotor core 5, is formed between the two magnet insertion holes 9 adjacent to each other in the same magnetic pole unit (space in the arrayed direction E). In the example of the first embodiment, the three magnet insertion holes 9 are assigned in one magnetic pole unit, and thus the two bridges 15 are formed in each magnetic pole unit. The bridges 15 each connect a core-outer portion 5a, which is located on a radially outer side of the magnet insertion hole 9, and a core-inner portion 5b, which is located on a radially inner side of the magnet insertion hole 9

In short, the rotor 1 has the plurality of separated rare-earth magnets 7 for one magnetic pole, and the rotor core 5 of the rotor 1 has, for one magnetic pole, the plurality of the same number of separated magnet insertion holes 9 as that of the plurality of rare-earth magnets 7 that are assigned to the one magnetic pole, and the bridge 15 is formed in every space between the adjacent magnet insertion holes 9 in each magnetic pole.

Figure 3:
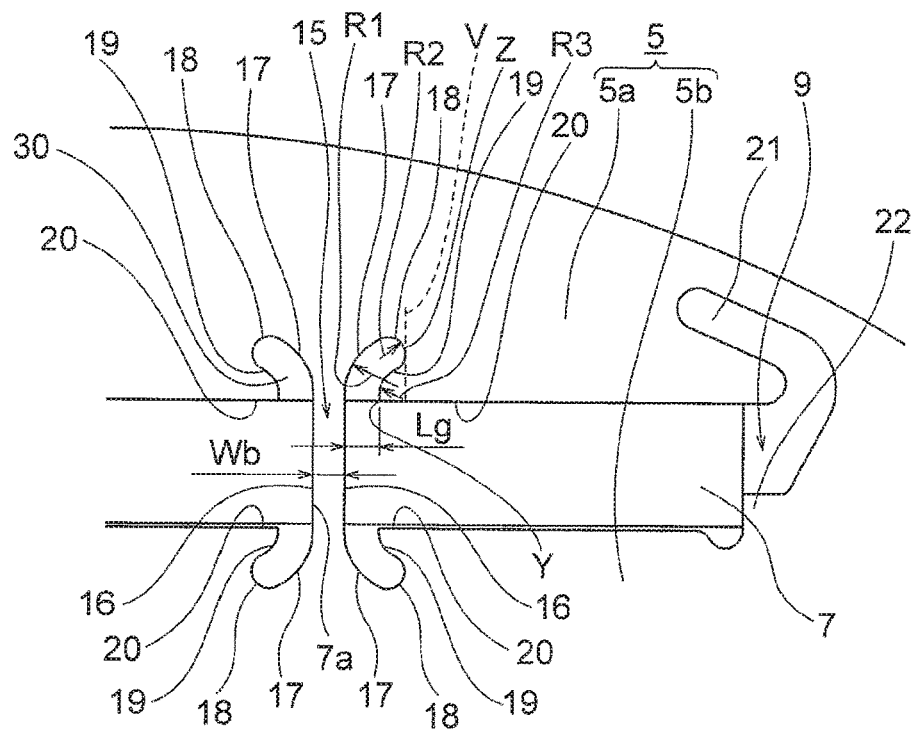
FIG. 3 is an enlarged view of a periphery of a magnet insertion hole that is in an edge along an arrayed direction of magnet insertion holes included in the same magnetic pole.

A detailed description is given below with reference to FIG. 2 and FIG. 3. FIG. 3 is a view for illustrating an enlarged periphery of the magnet insertion hole 9 that is in an edge along the arrayed direction E of the magnet insertion holes 9 included in the same magnetic pole. Of the three magnet insertion holes 9 included in the same magnetic pole, two magnet insertion holes 9 that are in the edges along the arrayed direction E of the magnet insertion holes 9 each have a flux barrier 21 and a positioning difference 22 formed therein. The flux barrier 21 is formed on a side of the corresponding magnet insertion hole 9 farther from the corresponding magnetic pole center line MC, and serves to reduce the leakage magnetic flux as well as cause the magnetic flux on the rotor surface to have a preferable sine wave shape to the extent possible. Further, the positioning difference 22 is formed on the side on which the flux barrier 21 is formed as described above.

The bridges 15 each include a pair of parallel linear portions 16 and two pairs of curved portions 17. Under a state in which the plurality of rare-earth magnets 7 are inserted into the corresponding plurality of magnet insertion holes 9, the pair of linear portions 16 are each in surface contact with a corresponding edge surface 7a of the corresponding rare-earth magnet 7 in the arrayed direction E. Note that, in a strict sense, there is a small gap between the rare-earth magnet 7 and the magnet insertion hole 9 for enabling assembly. The two pairs of curved portions 17 are connected to corresponding ends of the pair of linear portions 16 in an extending direction thereof (in this example, direction parallel to the magnetic pole center line MC), and the interval between the corresponding pair of curved portions 17 (in this example, an interval in the direction perpendicular to the magnetic pole center line MC) becomes larger as the interval becomes away from the linear portions 16.

As one example, in the first embodiment, one end side of a turn portion 18 is connected to a side of each of the two pairs of curved portions 17, which is aside opposite to the corresponding linear portion 16, one end side of a return portion 19 is connected to another end side of this turn portion 18, and another end side of the return portion 19 is connected to a corresponding magnet holding portion 20 of the corresponding magnet insertion hole 9. In addition, at least the curvature of the curved portion 17 is smaller than that of the turn portion 18. Further, the curvatures of the turn portion 18, the return portion 19, and the curved portion 17 become smaller in the stated order.

Note that, in the illustrated example of FIG. 3, the turn portion 18, the return portion 19, and the curved portion 17 are each formed into an arc shape, and thus the radii of curvature of the turn portion 18, the return portion 19, and the curved portion 17 become larger in the stated order. When described with use of the reference symbols in FIG. 3, the expression of "a radius of curvature R1 of the curved portion 17>a radius of curvature R2 of the turn portion 18" is satisfied in at least a relationship between the curved portion 17 and the turn portion 18. Further, the expression of "the radius of curvature R1 of the curved portion 17>a radius of curvature R3 of the return portion 19>the radius of curvature R2 of the turn portion 18" is satisfied in a relationship among the three of the turn portion 18, the return portion 19, and the curved portion 17. Further, the center of arc of the turn portion 18 is located between the return portion 19 and the curved portion 17, and the centers of arc of the return portion 19 and the curved portion 17 are located on sides away from the corresponding linear portion 16 and between the return portion 19 and the magnet holding portion 20 (including on the magnet holding portion 20).

In other words, in the first embodiment, the linear portion 16 and the magnet holding portion 20 are not directly connected to each other, and the curved portion 17 is interposed between the linear portion 16 and the magnet holding portion 20. In particular, in the illustrated example, the linear portion 16 is connected to the magnet holding portion 20 with the curved portion 17, the turn portion 18, and the return portion 19 interposed therebetween in the stated order.

A connection point between another end side of the return portion 19 and the magnet holding portion 20 (an intersection between the return portion 19 and the magnet holding portion 20, which matches with a distal end of the magnet holding portion 20) is represented as an end point Y of the return portion, and a position in the bridge 15 farthest away from the linear portion 16 when viewed in a bridge width direction (longitudinal direction of the magnet or the above-mentioned arrayed direction E) is represented as a protruding end Z. In this case, the end point Y of the return portion is located at a position closer to the linear portion 16 than the protruding end Z when viewed in the bridge width direction. Note that, as one example of understanding the protruding end Z, when a virtual line V extending along a direction perpendicular to the magnet holding portion 20 (direction along the above-mentioned magnetic pole center line MC) is assumed, the protruding end Z is an intersection between the bridge 15 and the virtual line V that is farthest away from the linear portion 16 when viewed in the bridge width direction. In the illustrated example, the protruding end Z exists in the turn portion 18.

In a portion corresponding to a distance Lg (in this example, a distance in the direction perpendicular to the magnetic pole center line MC) from the distal end of the magnet holding portion 20 to the bridge 15 (linear portion 16), the magnetic flux flowing out of or into the surface of the rare-earth magnet 7 passes through the air gap 30, to thereby cause the efficiency and output of the motor to deteriorate. Thus, it is preferred that Lg be set as short as possible in terms of manufacture. Therefore, in the case of punching magnetic steel sheets, it is appropriate to set Lg about one or two times as long as the sheet thickness.

Further, it is preferred that a width Wb of the bridge 15 be set as short as possible in terms of manufacture as long as a sufficient strength is ensured because as the width Wb becomes longer, the strength against the centrifugal force increases, whereas as the width Wb becomes shorter, the leakage magnetic flux decreases and larger dimensions of the rare-earth magnet 7 in the circumferential direction (in this example, dimensions in the direction perpendicular to the magnetic pole center line MC) can be secured. In the case of punching magnetic steel sheets, it is appropriate to set Wb about one or one and a half times as long as the sheet thickness.

With the interior permanent magnet motor as constructed above according to the first embodiment, the following advantages can be obtained. During operation of the motor, when a centrifugal force is acting on the rotor due to the rotation of the rotor, a large stress is acting on the bridge. In this case, in particular, in an aspect in which the magnet holding portion of the magnet insertion hole is connected to the bridge in such a manner that the magnet holding portion crosses the bridge approximately perpendicularly, a huge stress acts on the intersection portion, to thereby cause a so-called stress concentration. On the other hand, when a portion between the adjacent magnet insertion holes is curved in the bridge, there is a prospect of alleviating the stress concentration by a little amount. However, there exists a region that cannot be utilized for arrangement of the magnet in the space that is not occupied by the bridge in the magnet insertion hole by an amount corresponding to the curved portion between the adjacent magnet insertion holes, to thereby cause a problem in that the high efficiency of the output is prevented from being achieved. Further, even when the end surface of the magnet is formed to fit the curve of the bridge in order to address this problem, there arises another problem in that the cost of the magnet increases. Further, regarding the problem of the stress concentration, the stress concentration cannot be expected to be alleviated by a large amount as long as the portion between the adjacent magnet insertion holes in the bridge is directly connected to the magnet holding portion.

In order to address those problems, in the first embodiment, the portion between the adjacent magnet insertion holes in the bridge is formed as the linear portions, and the ends of those linear portions are connected to the curved portions whose interval from the linear portions becomes larger as the interval becomes away from the linear portions without being directly connected to the magnet holding portions. Thus, in the first embodiment, the stress that may act on the ends of the linear portions of the bridge can be reduced by a large amount. Further, in terms of the relationship between the curved portion and the air gap, when the radius of curvature of the curved portion is increased, the curved portion is curved gently to allow the stress concentration to be alleviated, but the air gap becomes larger and the magnetic flux passing through this air gap increases, to thereby cause a fear in that the efficiency and output of the motor may deteriorate. On the other hand, when the radius of curvature of the curved portion is decreased, the air gap becomes smaller and the magnetic flux passing through this air gap decreases, to thereby prevent the deterioration in efficiency and output of the motor. However, there is a fear in that the curved portion may have such a steep curve as to degrade the effect of alleviating the stress concentration. In regard to this, in the first embodiment, it is possible to achieve both of acquisition of the effect of alleviating the stress concentration and suppression in deterioration of the efficiency and output of the motor by adopting a plurality of curvatures, namely, the turn portion, the return portion, and the curved portion.

Further, the portion between the adjacent magnet insertion holes is formed as the linear portions in the bridge consistently, and thus an entire region between the adjacent magnet insertion holes can be utilized as a portion for contributing to the strength of the bridge, and at the same time, even when a magnet having a simple shape such as a rectangular shape is used, the entire edge surface of the magnet is in abutment with the bridge, to thereby enable the magnet to be exhaustively arranged in the magnet insertion hole without producing a large gap between the magnet and the bridge. It is possible to achieve the high efficiency of the output by acquiring a space for arranging the magnet effectively while avoiding increase in manufacture cost of the permanent magnet. In particular, in the case of the rare-earth magnet, a powder material is usually sintered to a large rectangular box and then cut into desired small rectangular boxes to be used, and thus it is possible to prepare the rare-earth magnet at the lowest cost when the rectangular box (that is, the cross section has a rectangular shape) is employed as its final shape. On the contrary, when a curved surface or a chamfer is formed, additional processing is required to produce additional costs.

Further, the endpoint Y of the return portion is located at a position closer to the linear portion 16 than the protruding end Z when viewed in the bridge width direction, and thus the distance Lg from the distal end of the magnet holding portion 20 to the linear portion 16 of the bridge 15 can be set short. Therefore, it is possible to cause the region of air gap formed by the curved portion, the turn portion, and the return portion to be smaller and the magnetic flux passing through this air gap to decrease. As a result, there is an advantage in that the deterioration in efficiency and output of the motor can be suppressed.

As described above, with the interior permanent magnet motor according to the first embodiment, it is possible to achieve improvement of the strength of the rotor core and the high efficiency of the output while avoiding the increase in manufacture cost of the permanent magnet.

Second Embodiment

Figure 4:
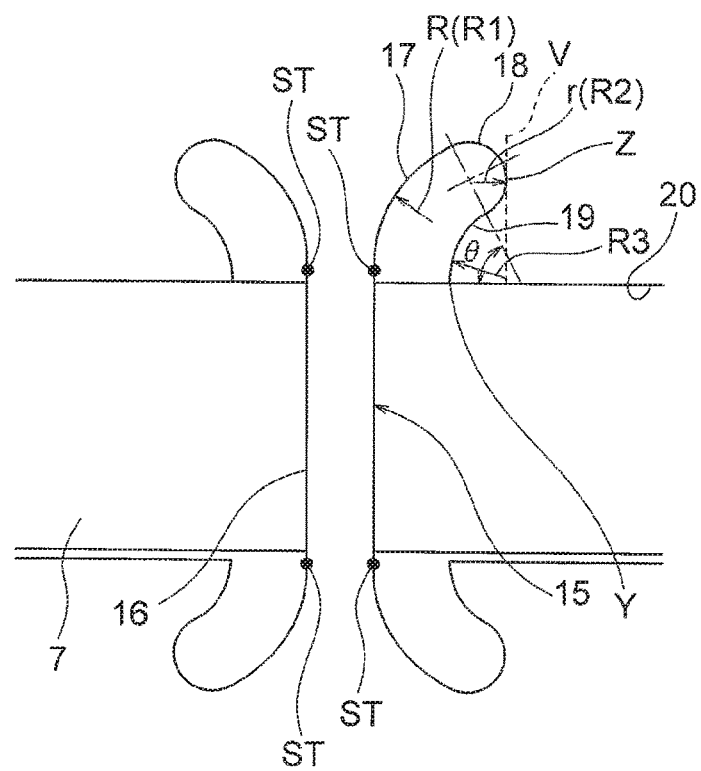
FIG. 4 is a view for illustrating a shape of a bridge and a shape of an air gap formed by the bridge according to a second embodiment of the present invention.
Figure 5:
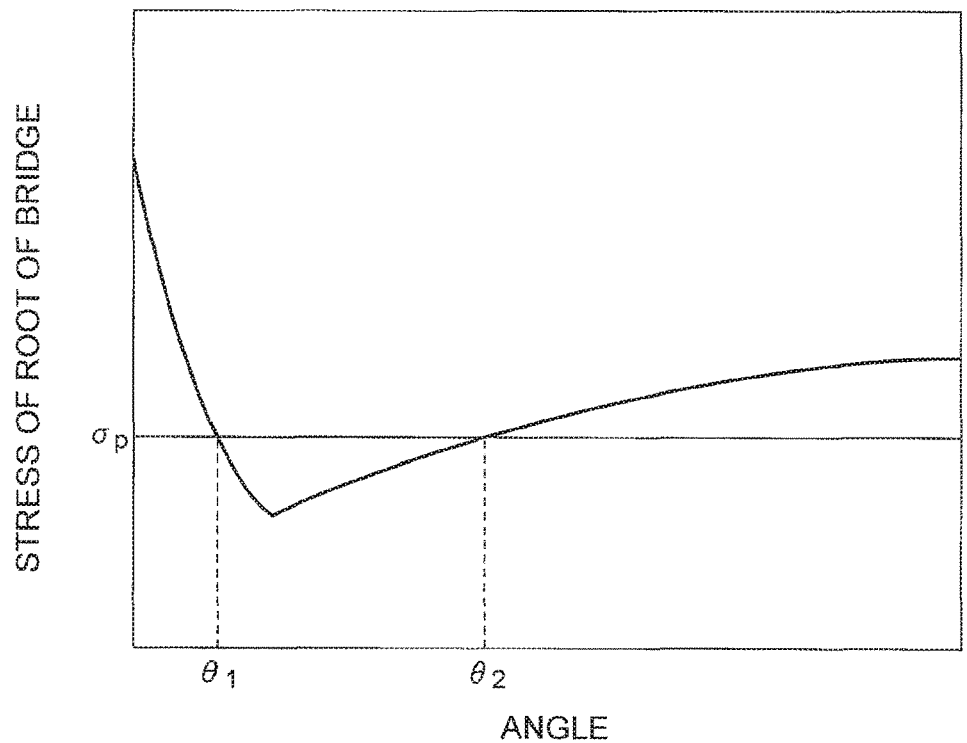
FIG. 5 is a graph for showing a relationship between a stress and an angle θ in regard to a description of the shapes of FIG. 4.

Next, a description is given of an interior permanent magnet motor according to a second embodiment of the present invention. FIG. 4 is a view for illustrating a shape of the bridge and a shape of the air gap formed by the bridge according to the second embodiment. Further, FIG. 5 is a graph for showing a relationship between the stress and an angle θ in regard to a description of the shapes of FIG. 4. Note that, the second embodiment is similar to the first embodiment except for a part described below. In other words, the second embodiment is an embodiment obtained by further limiting the first embodiment.

As illustrated in FIG. 4, a radius of an arc of the curved portion 17 is represented as R, and a radius of an arc of the turn portion 18 is represented as r. In the second embodiment, the curved portion 17, the turn portion 18, and the return portion 19 are formed along a locus obtained by rotationally moving in a fan-like form a half circle having an interval between the curved portion 17 and the return portion 19 as its diameter (2×r) so as to move away from the linear portion 16, and a rotational movement angle of the half circle is θ. Note that, also in the second embodiment, in at least the relationship between the curved portion 17 and the turn portion 18, the expression of "the radius of curvature R1 of the curved portion 17>the radius of curvature R2 of the turn portion 18" is satisfied. Further, in the relationship among the three of the turn portion 18, the return portion 19, and the curved portion 17, the expression of "the radius of curvature R1 of the curved portion 17>the radius of curvature R3 of the return portion 19>the radius of curvature R2 of the turn portion 18" is satisfied. Further, the end point Y of the return portion is located at a position closer to the linear portion 16 than the protruding end Z when viewed in the bridge width direction.

FIG. 5 is an example (a result of elasticity analysis) of a value of the stress at a stress concentration position ST (a boundary portion between the linear portion 16 and the curved portion 17) of the root of the bridge when a centrifugal force is acting with the bridge width Wb=0.6 (mm), R=2 (mm), and r=0.5 (mm). The "stress" in this case refers to a value called "von Mises stress" in a strict sense, and indicates a value (used for determination of a yield criterion) corresponding to a tensile stress when an uniaxial tensile stress is applied. The symbols σp in FIG. 5 indicates an allowable value (a threshold value of OK/NG), and is set in consideration of the strength and safety factor of magnetic steel sheets.

In the second embodiment, in a relational line (line of FIG. 5) between the rotational movement angle θ and a stress σ of the stress concentration position ST, the rotational movement angle θ is set within an angle range in which the stress σ is lower than the allowable value σp.

Also according to the second embodiment, it is possible to achieve improvement of the strength of the rotor core and the high efficiency of the output while avoiding the increase in manufacture cost of the permanent magnet. Further, the radius of curvature R1 of the curved portion 17 is usually far larger than the radius of curvature R2 of the turn portion 18, and thus the relationship of R1=R3+(2×R2) is more likely to be obtained as described in the second embodiment by setting the expression of "the radius of curvature R1 of the curved portion 17>the radius of curvature R3 of the return portion 19>the radius of curvature R2 of the turn portion 18". In other words, with the setting of the expression of "the radius of curvature R1 of the curved portion 17>the radius of curvature R3 of the return portion 19>the radius of curvature R2 of the turn portion 18", it is easier to realize an ideal form in which the interval between the curved portion 17 and the return portion 19 is constant over a range of an arc of the angle θ.

Third Embodiment

Figure 6:
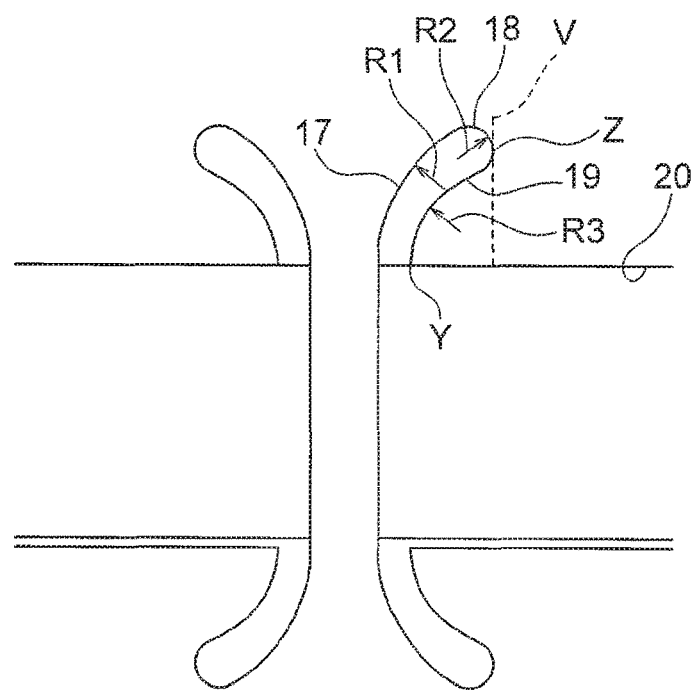
FIG. 6 is a view for illustrating a shape of a bridge and a shape of an air gap formed by the bridge according to a third embodiment of the present invention.

Next, a description is given of an interior permanent magnet motor according to a third embodiment of the present invention. FIG. 6 is a view for illustrating a shape of the bridge and a shape of the air gap formed by the bridge according to the third embodiment of the present invention. Note that, the third embodiment is similar to the first embodiment except for a part described below.

Also in the third embodiment, in the relationship among the three of the turn portion 18, the return portion 19, and the curved portion 17, the expression of "the radius of curvature R1 of the curved portion 17>the radius of curvature R3 of the return portion 19>the radius of curvature R2 of the turn portion 18" is satisfied. Note that, the radius of curvature of the return portion 19 in the third embodiment is smaller than the radii of curvature of the return portion 19 in the first and second embodiments. In particular, the second embodiment has such a feature that the curved portion 17, the turn portion 18, and the return portion 19 are formed along a locus obtained by rotationally moving in a fan-like form a half circle having an interval between the curved portion 17 and the return portion 19 as its diameter (2×r) so as to move away from the linear portion 16. However, the radius of curvature of the return portion 19 in the third embodiment is smaller than the radius of curvature of the return portion 19 in the second embodiment having such a feature. Note that, also in the third embodiment, in at least the relationship between the curved portion 17 and the turn portion 18, the expression of "the radius of curvature R1 of the curved portion 17>the radius of curvature R2 of the turn portion 18" is satisfied. Further, the endpoint Y of the return portion is located at a position closer to the linear portion 16 than the protruding end Z when viewed in the bridge width direction.

Also according to the third embodiment, it is possible to achieve improvement of the strength of the rotor core and the high efficiency of the output while avoiding the increase in manufacture cost of the permanent magnet. In particular, in the third embodiment, the interval between the curved portion 17 and the return portion 19 on a side closer to the linear portion 16 is smaller than the interval between the curved portion 17 and the return portion 19 on a side closer to the turn portion 18, and thus an effect of shortening the distance Lg from the distal end of the magnet holding portion 20 to the linear portion 16 of the bridge 15 can be expected further compared to the first and second embodiments.

Fourth Embodiment

Figure 7:
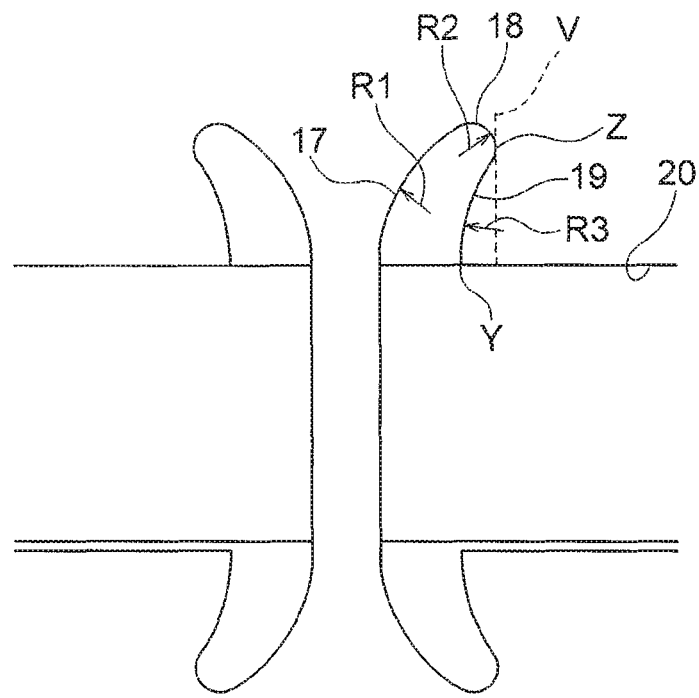
FIG. 7 is a view for illustrating a shape of a bridge and a shape of an air gap formed by the bridge according to a first example of a fourth embodiment of the present invention.
Figure 8:
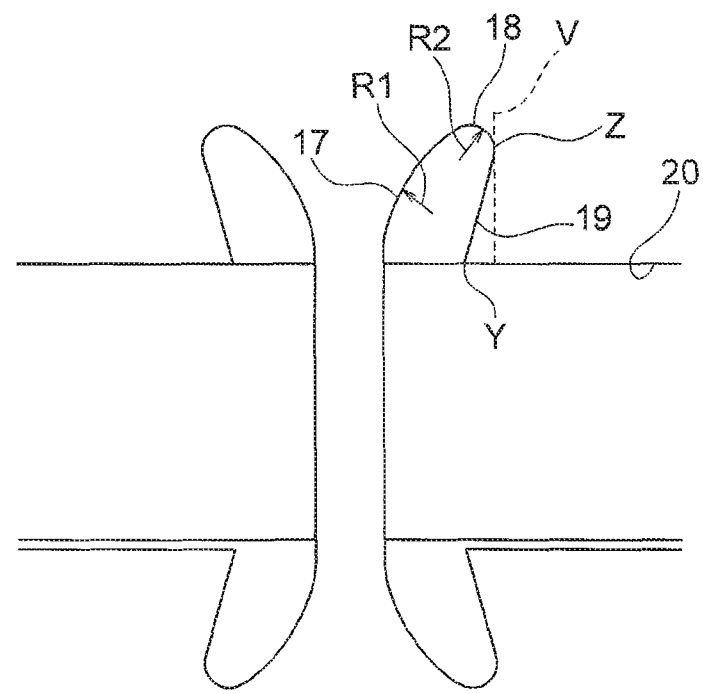
FIG. 8 is a view for illustrating a shape of a bridge and a shape of an air gap formed by the bridge according to a second example of the fourth embodiment of the present invention.

Next, a description is given of an interior permanent magnet motor according to a fourth embodiment of the present invention. FIG. 7 and FIG. 8 are views for illustrating shapes of the bridge and shapes of the air gap formed by the bridge according to first and second examples of the fourth embodiment of the present invention. Note that, the fourth embodiment is similar to the first embodiment except for a part described below.

The present invention only needs to satisfy at least the expression of "the radius of curvature R1 of the curved portion 17>the radius of curvature R2 of the turn portion 18", and is not limited to the aspect described above as to the relationship among the curved portion 17, the turn portion 18, and the return portion 19.

The first example of the fourth embodiment illustrated in FIG. 7 has a relationship of the expression of "the radius of curvature R3 of the return portion 19>the radius of curvature R1 of the curved portion 17>the radius of curvature R2 of the turn portion 18". Further, the endpoint Y of the return portion is located at a position closer to the linear portion 16 than the protruding end Z when viewed in the bridge width direction. Further, in the second example of the fourth embodiment illustrated in FIG. 8, the return portion 19 is a portion extending linearly in the drawing sheet of FIG. 8, and thus the radius of curvature R3 of the return portion 19 does not exist. Also in FIG. 8, the end point Y of the return portion is located at a position closer to the linear portion 16 than the protruding end Z when viewed in the bridge width direction.

Also according to the fourth embodiment, it is possible to achieve improvement of the strength of the rotor core and the high efficiency of the output while avoiding the increase in manufacture cost of the permanent magnet. Further, also in both the first and second examples of the fourth embodiment, the expression of "the radius of curvature R1 of the curved portion 17>the radius of curvature R2 of the turn portion 18" is satisfied, and the end point Y of the return portion is located at a position closer to the linear portion 16 than the protruding end Z when viewed in the bridge width direction. Thus, the effect of shortening the distance Lg from the distal end of the magnet holding portion 20 to the linear portion 16 of the bridge 15 can be expected.

Fifth Embodiment

Figure 9:
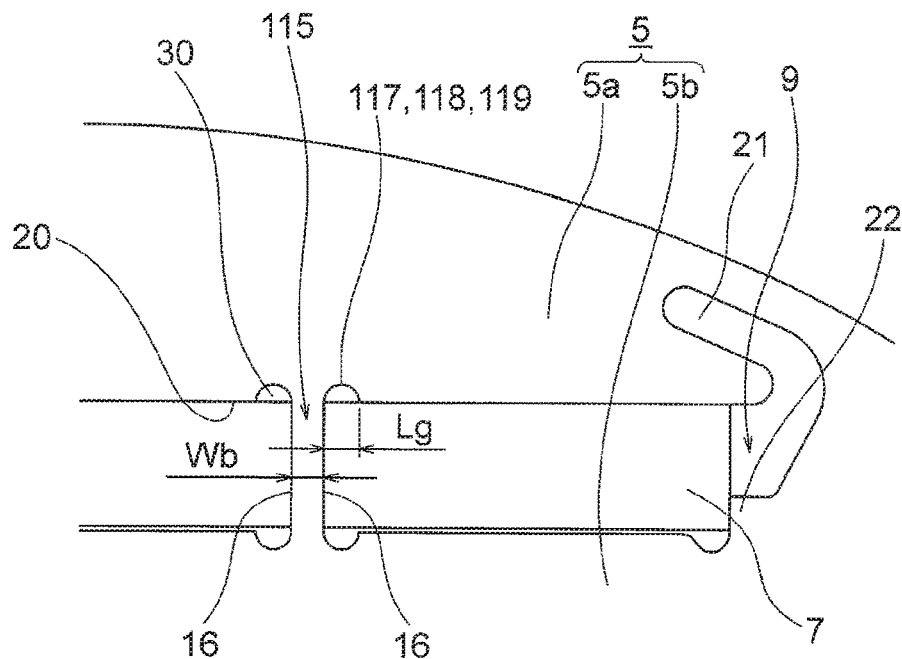
FIG. 9 is a view in the same mode as FIG. 3 according to a fifth embodiment of the present invention.

Next, a description is given of an interior permanent magnet motor according to a fifth embodiment of the present invention. FIG. 9 is a view in the same mode as FIG. 3 according to the fifth embodiment. Note that, the fifth embodiment is similar to the first embodiment except for a part described below.

Bridges 115 in the fifth embodiment each include the pair of parallel linear portions 16 that are similar to those of the first embodiment and two pairs of curved portions 117. The two pairs of curved portions 117 are connected to corresponding ends of the pair of linear portions 16 in an extending direction thereof, and the interval between the corresponding pair of curved portions 117 becomes larger as the interval becomes away from the linear portions 16.

Further, one end side of a turn portion 118 is connected to a side of each of the two pairs of curved portions 117, which is a side opposite to the corresponding linear portion 16, one end side of a return portion 119 is connected to another end side of this turn portion 118, and another end side of the return portion 119 is connected to the corresponding magnet holding portion 20 of the corresponding magnet insertion hole 9. In the fifth embodiment, the turn portion 118, the return portion 119, and the curved portion 117 have the same curvature, that is, the turn portion 118, the return portion 119, and the curved portion 117 are formed without distinct boundaries and form one arc having a single radius (in this example, a half arc).

Note that, in the illustrated example, the width Wb of the bridge 115 is the same as the width of the bridge 15 in the first embodiment, and the distance Lg from the distal end of the magnet holding portion 20 to the bridge 115 (linear portion 16) is set to the same length as the diameter of the arc of the turn portion 18 of the bridge 15 in the first embodiment described above.

Also according to the fifth embodiment, it is possible to achieve improvement of the strength of the rotor core and the high efficiency of the output while avoiding the increase in manufacture cost of the permanent magnet.

Sixth Embodiment

Figure 10:
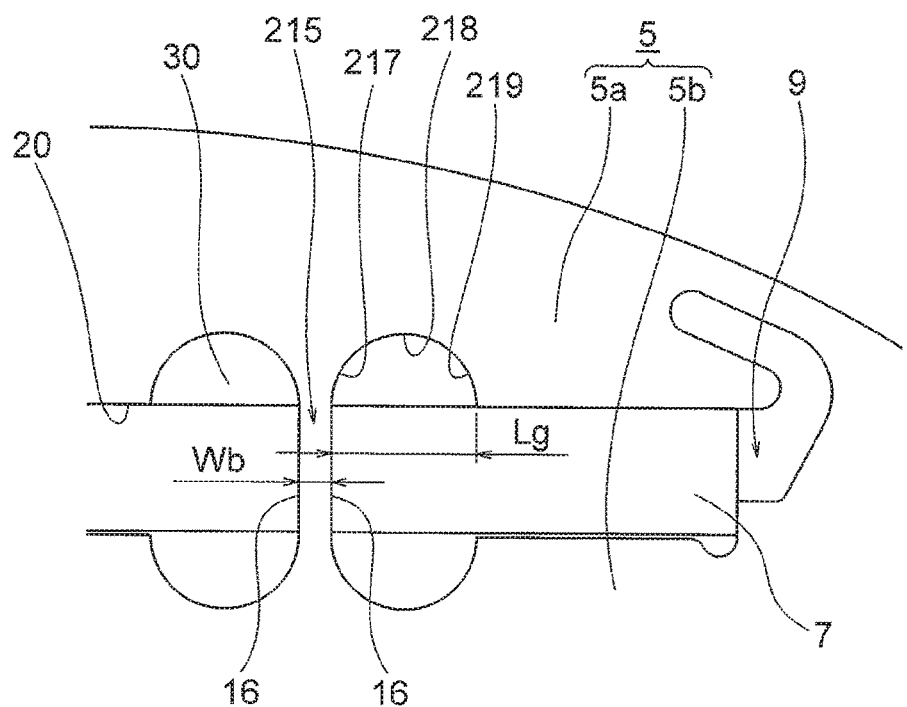
FIG. 10 is a view in the same mode as FIG. 3 according to a sixth embodiment of the present invention.

Next, a description is given of an interior permanent magnet motor according to a sixth embodiment of the present invention. FIG. 10 is a view in the same mode as FIG. 3 according to the sixth embodiment. Note that, the sixth embodiment is similar to the fifth embodiment except for a part described below.

Bridges 215 in the sixth embodiment each correspond to one obtained by increasing the bridge 115 in the fifth embodiment in size with its similarity relationship maintained. The bridges 215 each include the pair of parallel linear portions 16 that are similar to those of the first embodiment and two pairs of curved portions 217. A turn portion 218, a return portion 219, and the curved portion 217 are formed without distinct boundaries and form one arc having a single radius (in this example, a half arc). In the illustrated example, the width Wb of the bridge 215 is the same as the width of the bridge 15 in the first embodiment, and the distance Lg from the distal end of the magnet holding portion 20 to the bridge 215 (linear portion 16) is set to the same length as the diameter of the arc of the curved portion 17 of the bridge 15 in the first embodiment described above.

Also according to the sixth embodiment, it is possible to achieve improvement of the strength of the rotor core and the high efficiency of the output while avoiding the increase in manufacture cost of the permanent magnet.

Seventh Embodiment

Figure 11:
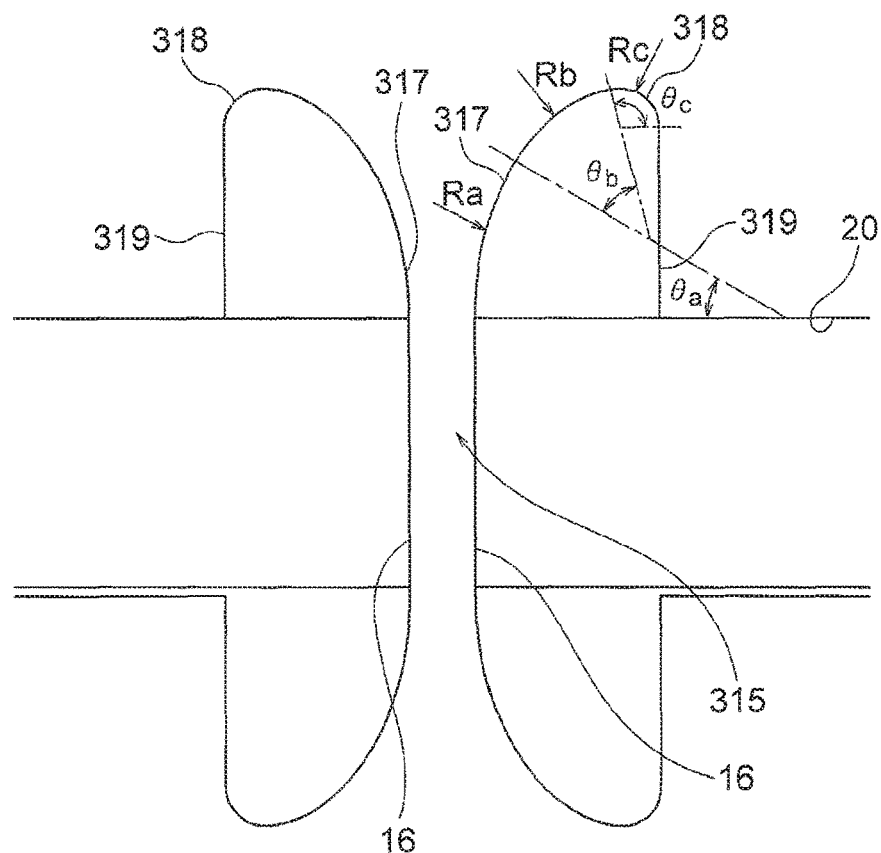
FIG. 11 is an enlarged view of a part of a bridge according to a seventh embodiment of the present invention.

Next, a description is given of an interior permanent magnet motor according to a seventh embodiment of the present invention. FIG. 11 is a view in the same mode as FIG. 3 according to the seventh embodiment. Note that, the seventh embodiment is similar to the first embodiment except for a part described below.

In the present invention, it is important to provide the curved portion 17 having a boundary with the linear portion 16 as a structure for alleviating the stress concentration, and the line connecting the curved portion 17 and the magnet holding portion 20 has a small influence on the stress on the root of the bridge, and thus has a large degree of freedom in terms of its shape. The seventh embodiment is an example of an aspect in which the line including the curved portion, the turn portion, and the return portion is not a uniform arc, but rather does not have a common center of arc and partially includes a straight line.

Bridges 315 in the seventh embodiment each include the pair of parallel linear portions 16 that are similar to those of the first embodiment and two pairs of curved portions 317. The two pairs of curved portions 317 are connected to corresponding ends of the pair of linear portions 16 in an extending direction thereof, and the interval between the corresponding pair of curved portions 317 becomes larger as the interval becomes away from the linear portions 16.

One end side of a turn portion 318 is connected to a side of each of the two pairs of curved portions 317, which is a side opposite to the corresponding linear portion 16, one end side of a return portion 319 is connected to another end side of this turn portion 318, and another end side of the return portion 319 is connected to the corresponding magnet holding portion 20 of the corresponding magnet insertion hole 9. In the seventh embodiment, the return portion 319 extends linearly.

More specifically, the two pairs of curved portions 317 are each formed of an arc of a radius Ra that has a center of arc on the magnet holding portion 20 and extends with an angle range θa, and an arc of a radius Rb that has a center of arc on a line defining the angle range θa from the magnet holding portion 20 and extends with an angle range θb. Further, the turn portion 318 is formed of an arc of a radius Rc that has a center of arc on a line defining the angle range θb for the curved portion 317 and extends with an angle range θc. Further, the return portion 319 is formed of a straight line extending from the terminal end of the turn portion 318 to the magnet holding portion 20 so as to cross the magnet holding portion 20 perpendicularly.

Also according to the seventh embodiment, it is possible to achieve improvement of the strength of the rotor core and the high efficiency of the output while avoiding the increase in manufacture cost of the permanent magnet.

Eighth Embodiment

Figure 12:
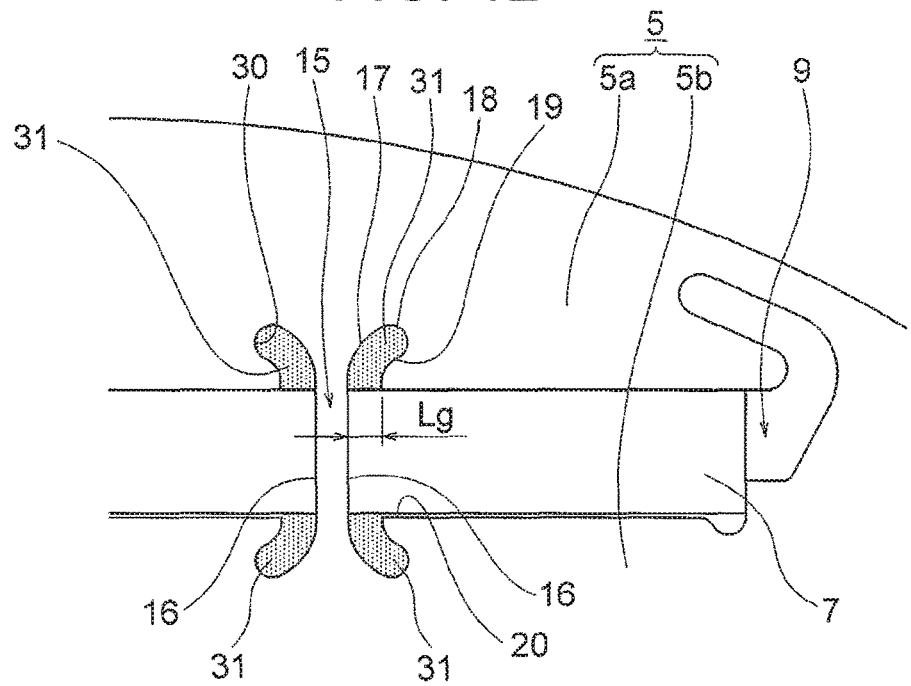
FIG. 12 is a view in the same mode as FIG. 3 according to an eighth embodiment of the present invention.

Next, a description is given of an interior permanent magnet motor according to an eighth embodiment of the present invention. FIG. 12 is a view in the same mode as FIG. 3 according to the eighth embodiment. Note that, the eighth embodiment is similar to the first embodiment except for a part described below.

In the eighth embodiment, the bridge 15 and the air gap 30 (space surrounded by the curved portions 17, the turn portions 18, the return portions 19, and corresponding surfaces of the rare-earth magnets 7) similar to those of the first embodiment are formed. Then, a material 31 having a magnetic permeability at least higher than that of the air is arranged in the air gap 30.

Also according to the eighth embodiment, it is possible to achieve improvement of the strength of the rotor core and the high efficiency of the output while avoiding the increase in manufacture cost of the permanent magnet. Further, in the eighth embodiment, in a portion of the distance Lg from the end of the magnet holding portion 20 to the bridge 15, the magnetic flux flowing out of or into the surface of the rare-earth magnet 7 does not need to pass through the air having a small magnetic permeability, and thus the efficiency of the magnetic circuit can be improved further, to thereby be able to further achieve high efficiency and high output of the motor.

Ninth Embodiment

Next, a description is given of a ninth embodiment of the present invention. The ninth embodiment is similar to the structure of FIG. 12 when illustrated. Note that, the ninth embodiment is similar to the first embodiment except for a part described below.

In the ninth embodiment, resin and a powder magnetic material are mixed to serve as the material 31 for filling the air gap 30 in the eighth embodiment, and injected into the air gap 30 to be molded.

Also according to the ninth embodiment, it is possible to achieve improvement of the strength of the rotor core and the high efficiency of the output while avoiding the increase in manufacture cost of the permanent magnet. Further, similarly to the eighth embodiment, the efficiency of the magnetic circuit can be improved further, to thereby be able to further achieve high efficiency and high output of the motor. Further, the ninth embodiment is extremely productive in terms of filling the air gap with a material compared to a case in which the material for filling the air gap is a solid material (e.g., long and thin iron having a pillar shape).

Note that, a description has been given of the eighth and ninth embodiments in combination with the air gap of the first embodiment, but those embodiments are not limited to this combination. The material described in the eighth or ninth embodiment may be filled into the air gap produced in the second to seventh embodiments.

Although the details of the present invention are specifically described above with reference to the preferred embodiments, it is apparent that persons skilled in the art may adopt various modifications based on the basic technical concepts and teachings of the present invention.

For example, in the above description, the number of magnetic poles is six, and the magnet insertion hole and the rare-earth magnet are each divided into three for one magnetic pole, to thereby form two bridges. However, the present invention is not limited to those numbers. Thus, the present invention can also be carried out as an aspect in which the magnet insertion hole and the rare-earth magnet are divided into two for one magnetic pole, to thereby form one bridge, or an aspect in which the magnet insertion hole and the rare-earth magnet are divided into four or more for one magnetic pole, to thereby form three or more bridges.

Further, in the present invention, the bridge only needs to include the linear portion and the curved portion, and thus various modifications may be made as to what kind of line is drawn when another end of the curved portion whose one end is connected to the linear portion is connected to the magnet holding portion as viewed in a cross section perpendicular to the rotation axis.

The illustrated examples of the first to ninth embodiments described above are illustrations of the linear portion, the curved portion, the turn portion, and the return portion being formed in each of the bridges symmetrically in vertical and horizontal directions (symmetric with respect to both of the direction parallel to the magnetic pole center line MC and the arrayed direction E), but the present invention is not limited to this formation.

Further, the eighth and ninth embodiments can be carried out such that a material having a magnetic permeability at least higher than that of the air is filled into a part of a plurality of air gaps or filled into the inside of one air gap partially.

Further, the permanent magnet used in the present invention is not limited to the rare-earth magnet, but may be another kind of permanent magnet. For example, a ferrite magnet can also be used.

REFERENCE SIGNS LIST 1, rotor; 2, stator; 7, rare-earth magnet (permanent magnet); 9, magnet insertion hole; 15, 115, 215, 315, bridge; 16, linear portion; 17, 117, 217, 317, curved portion; 18, 118, 218, 318, turn portion; 19, 119, 219, 319, return portion; 20, magnet holding portion; 30, air gap; 31, material; E, arrayed direction; MC, magnetic pole center line; R1, radius of curvature of curved portion; R2, radius of curvature of turn portion; R3, radius of curvature of return portion; Y, end point of return portion; Z, protruding end

The invention claimed is:
1. An interior permanent magnet motor, comprising:
a stator; and
a rotor rotatably supported to face the stator,
the rotor comprising a plurality of separated permanent magnets for one magnetic pole,
wherein a rotor core of the rotor comprises a plurality of the same number of separated magnet insertion holes as a number of the plurality of permanent magnets for one magnetic pole,
wherein bridges are formed between respective adjacent ones of the magnet insertion holes in each magnetic pole,
wherein each of the bridges comprises a pair of parallel linear portions and two pairs of curved portions,
wherein, under a state in which the plurality of permanent magnets are inserted into the plurality of corresponding magnet insertion holes, each of the pair of linear portions is in contact with a corresponding edge surface of the corresponding permanent magnet in an arrayed direction,
wherein the two pairs of curved portions are connected to corresponding ends of the linear portions in an extending direction of the linear portions and an interval between the pair of corresponding curved portions becomes larger in a direction away from the linear portions, and wherein an end point Y of a return portion is located at a position closer to the linear portion than a protruding end Z of the bridge when viewed in a bridge width direction.

2. An interior permanent magnet motor according to claim 1, wherein one end side of a turn portion is connected to a side of each of the two pairs of curved portions, which is a side opposite to the corresponding linear portion, one end side of the return portion is connected to another end side of the turn portion, and another end side of the return portion is connected to a corresponding magnet holding portion in the corresponding magnet insertion hole.

3. An interior permanent magnet motor according to claim 2, wherein a radius of curvature (R1) of the curved portions is greater than a radius of curvature (R2) of the turn portions.

4. An interior permanent magnet motor according to claim 2, wherein a curvature of the turn portion is greater than a curvature of the return portion, and a curvature of the return portion is greater than a curvature of the curved portion.

5. An interior permanent magnet motor according to claim 4,
wherein the turn portion, the return portion, and the curved portion are formed along a locus obtained by rotationally moving in a fan-like form a half circle having an interval between the curved portion and the return portion as a diameter so as to move away from the linear portion, and
wherein a rotational movement angle $\theta$ of the half circle is set within an angle range in which a stress a on the end of the linear portion is lower than an allowable value σp in a relational line between the rotational movement angle $\theta$ and the stress σ.

6. An interior permanent magnet motor according to claim 1, wherein a material having a magnetic permeability at least higher than a magnetic permeability of air is filled into the air gap produced between the curved portion of the bridge and the permanent magnet.

* * * * *